Figure 3:
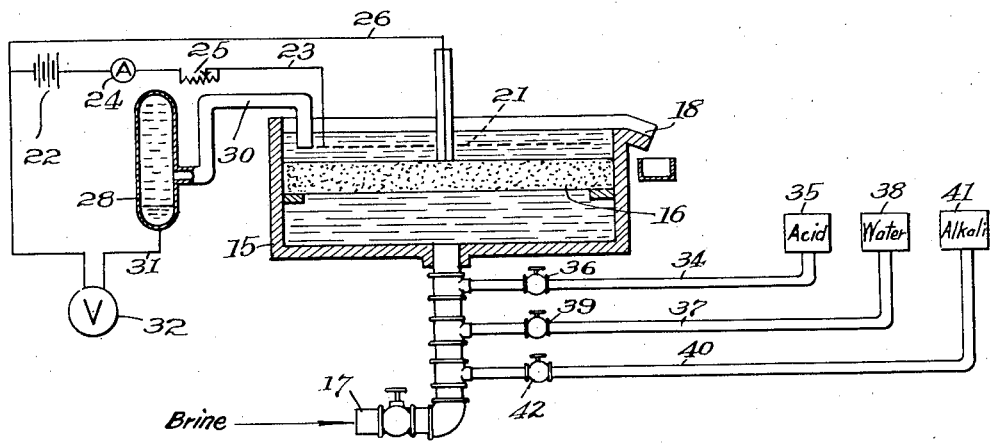

Aug. 8, 1933.　　　F. G. COTTRELL　　　1,921,563
METHOD OF SEPARATING DIFFICULTLY SOLUBLE CONSTITUENTS FROM DILUTE SOLUTIONS
Filed July 14, 1931　　　2 Sheets-Sheet 1
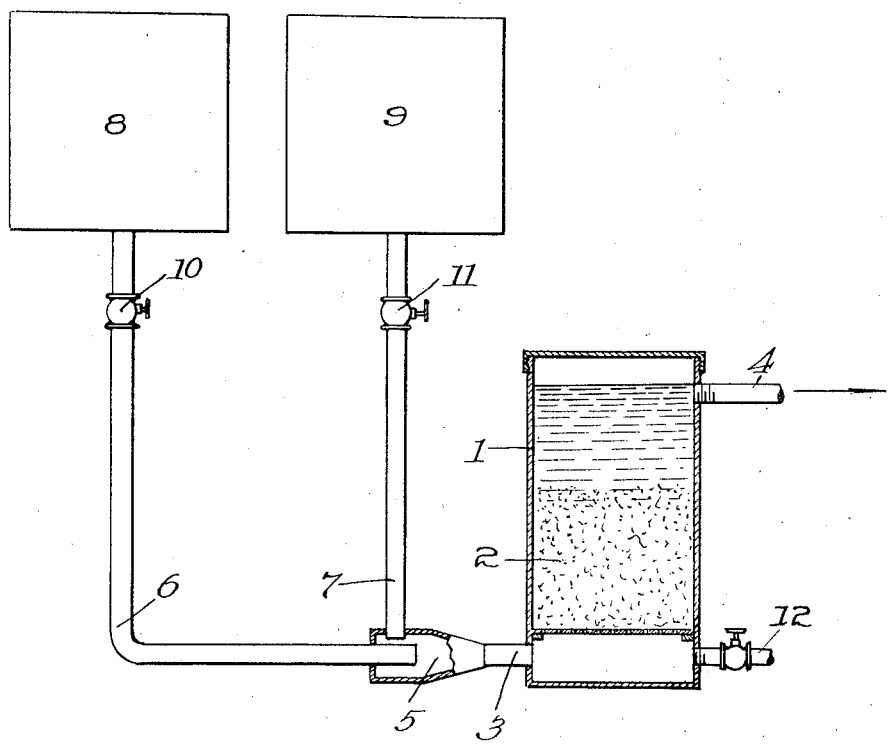
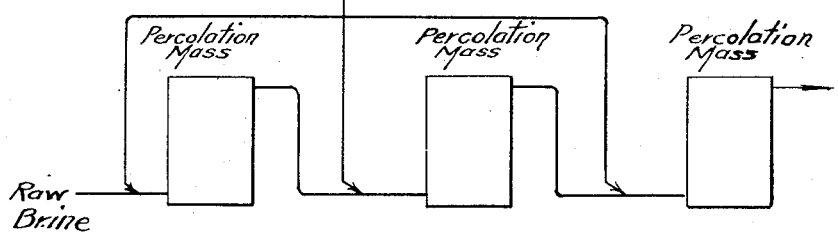
INVENTOR.
Frederick G. Cottrell,
BY Arthur P. Knight
Alfred W. Knight
ATTORNEYS.

Aug. 8, 1933.  F. G. COTTRELL  1,921,563
METHOD OF SEPARATING DIFFICULTLY SOLUBLE CONSTITUENTS FROM DILUTE SOLUTIONS
Filed July 14, 1931   2 Sheets-Sheet 2

INVENTOR.
Frederick G. Cottrell,
BY Arthur P. Knight &
Alfred W. Knight
ATTORNEYS.

Patented Aug. 8, 1933

1,921,563

UNITED STATES PATENT OFFICE 1,921,563

METHOD OF SEPARATING DIFFICULTLY SOLUBLE CONSTITUENTS FROM DILUTE SOLUTIONS

Frederick G. Cottrell, Washington, D. C., assignor to General Salt Company, Los Angeles, Calif., a Corporation of California Application July 14, 1931. Serial No. 550,709

9 Claims. (Cl. 23—217)

This invention relates to a method of separating difficultly soluble constituents from dilute solutions thereof. The invention is particularly applicable to the separation of iodine and/or bromine from dilute brines in which such elements exist as iodine or bromide ions, but the invention is also applicable to the separation of other elements or radicals which exist in such dilute solution as to render the separation thereof difficult, but certain compounds of which are of low solubility.

In former procedures for recovery of iodine for example, it has been customary to either add the reagent for precipitating the insoluble iodine compound in the form of solution to the mass of brine from which the iodine was to be extracted or else add such compound directly as a more or less soluble solid (or liquid) salt or compound (e. g. CuCl), stirred into the body of the solution, which would go into solution and precipitate the insoluble iodine compound throughout the body of the brine under treatment.

In the relatively dilute brines to which the present process has its most important application as an improvement over former procedures, either of these procedures immediately results in production, at least temporarily of a condition of supersaturation followed by precipitation of the insoluble iodine compound, the resulting precipitate being initially colloidal or in a state of extremely fine division, and the size of the particles of the precipitate tending to increase with lapse of time. This growth of the particles of the precipitate is due both to the deposition on some of the particles present of the supersaturated constituent of the solution and to the re-solution of the constituent of the small particles followed by deposition of such constituent on the larger particles, for the reason that the solubility of the constituent decreases with increase in size of the particles.

Both the constituent which is in supersaturated solution and the constituent which is in the form of a colloidal precipitate, constitute a potential precipitate recoverable according to my present process, and the term potential precipitate as hereinafter used is intended to include the constituent in either or both of these conditions.

It has further been the practice to attempt to collect such colloidal precipitates, by first causing aggregation of same into larger suspended particles by means of agitation, and then removing the aggregated particles from the liquid by mechanical separating operation, such as filtration or sedimentation under the action of gravity or centrifugal force. Such procedure is necessarily slow, expensive and inefficient, particularly where the solution to be treated is extremely dilute, on account of the difficulty of obtaining effective separation of the precipitate. In case the original solution contains other suspended matter or impurities, the procedure is especially undesirable, as such suspended matter will necessarily be collected along with the desired material in the final removal process either by filtration or sedimentation and is often of a character to clog and obstruct filters and otherwise make the collection and removal of the valuable materials sought more difficult.

The main object of the present invention is to overcome these difficulties and provide for separation of the desired components without the use of filtration or sedimentation, and without the necessity of mechanically agglomerating the colloidal particles into larger suspended particles, thereby obviating the objectionable results that follow upon the use of such operations, and providing more rapid, effective and economical separation of the desired constituent.

An important feature of the present invention is that the solution containing the desired constituent in supersaturated and/or in the form of a colloidal or extremely finely divided precipitate such as above referred to, and which is hereinafter referred to as a state of potential precipitation is brought into contact with a substantially quiescent body or mass of the solid material to be removed or its "nuclear" equivalent so that the constituent or constituents of such colloidal precipitate and/or supersaturation solution will be transferred to or deposited in or on such body or mass. This operation takes place by reason of the lack of equilibrium in the system composed of the solid mass, the solution, and the finely divided particles, the solution pressure being greater in the case of the finely divided particles than in the case of the solid mass in comparatively undivided condition, as hereinafter explained.

The body or mass of solid material referred to may consist of granules or be otherwise in any suitable state of aggregation presenting portions which are relatively massive or undivided as compared with the colloidal or extremely finely divided precipitated particles, but which are sufficiently granular or subdivided to present a large surface capable of taking up the desired constituent within practicable limits of time and space. Such body or mass also preferably consists of or contains, or is coated with a material consisting of the same constituent which is to be separated, or a material which is isomorphic or substantially isomorphic with such constituent so as to serve as an inoculating foundation for deposition of the said constituent, such constituent being in a macro-crystalline or macro-aggregated form.

In the accompanying drawings Fig. 1 illustrates an apparatus suitable for carrying out the invention; and Fig. 2 is a flow sheet of a modified embodiment of the invention; and Fig. 3 is a vertical section of an apparatus suitable for carrying out a modified embodiment of the process.

My improved method of operation may be carried out in any suitable apparatus, for example, in the apparatus shown in the drawings, comprising a tank 1, in which is supported or mounted the granular or pervious body or mass 2 consisting of or coated or impregnated with the deposition-enforcing material. The tank is provided with means such as inlet pipe 3 for supply of the liquid to be treated and with means such as outlet pipe 4 for conveying away the treated liquid. I prefer to perform the separating operation by means of said granular body promptly after the formation of the precipitate and/or supersaturated solution and for this purpose the inlet pipe 3 may communicate with a mixing nozzle 5 to which the original solution is supplied by pipe 6 leading, for example, from a reservoir 8; and is supplied with precipitating agent by pipe 7 leading from a reservoir 9 so that the supersaturated liquid containing eventually more or less precipitated colloidal or finely divided material passes directly and immediately to the separating body or mass 2. Valves 10 and 11 are provided in pipes 6 and 7 to enable regulation of the supply of the liquids passing therethrough. A pipe connection 12 may also be provided for supplying to tank 1 a fluid, either gaseous or liquid, for effecting removal of the deposited compound or material.

The body 2 may consist of a granular mass of solid material which is of such nature that it tends to enforce deposition of the desired constituents upon such material, for example, in case it is desired to collect a compound of iodine which is still in supersaturated solution or has been partly precipitated in colloidal condition, the said body 2 may consist of such compound in relatively massive condition. Thus, assuming that the iodine is precipitated from the solution in the form of silver iodide, the body 2 may consist of a granular or pervious mass formed of or coated with silver iodide or a compound or substance which is substantially isomorphic with silver iodide.

The brine to be treated containing, for example, sodium iodide in extremely dilute solutions may be supplied from the source 8 through pipe 6 in regulated quantity and a suitable precipitating reagent, for example, a solution of silver nitrate is supplied through pipe 7, the quantity of such reagent being regulated by valve 11 to correspond with the iodine content of the solution to be treated. The solution to be treated and the said reagent react upon being mixed at 5 to form a supersaturated solution and/or precipitate of silver iodide and on account of the extremely dilute nature of the solution this precipitate will first form in colloidal or extremely finely divided form. The liquid carrying such suspended precipitate if any passes immediately to the tank 1 and percolates, preferably in an upward direction, through the percolation mass 2. Even though each colloidal particle may be approximately in equilibrium with the solution immediately surrounding it, equilibrium in the system as a whole no longer applies when the liquid carrying the suspended particles is brought into contact with the relatively massive body 2, as the massiveness of such body itself influences the point of equilibrium between this solid and the liquid, silver iodide depositing on it from the liquid and the suspended particles of colloidal silver iodide passing back into solution until all silver iodide in excess of that represented by its true solubility with reference to the macro-crystalline phase has been deposited. This effect of massiveness or size of the particles of solid aggregations of any material upon the equilibrium of a solid phase of such material with the liquid phase of same, is referred to for example in "The Phase Rule", by A. Findlay, London 1917, page 10.

In the system consisting of the relatively large granules of silver iodide in the percolation mass 2, the relatively small particles of precipitate and the residual dissolved silver iodide in the solution, the solution-pressure at the surfaces of the small particles is greater than the solution-pressure at the surface of the large granule in body 2, with the result that the system is not in equilibrium and some of the residual dissolved silver iodide will be deposited on the surfaces of the granular mass 2. This operation decreases the concentration of silver iodide in the solution and the equilibrium between the colloidal precipitate particles and the liquid phase is thereby disturbed and in order to restore equilibrium solution of part of the colloidal precipitate in the liquid will occur. This operation will proceed until substantially all of the colloidal precipitate is redissolved in the liquid and deposited eventually upon the granular massive surface of silver iodide, the rate of flow of the liquid through the percolation mass being adjusted to give this process time to complete itself to whatever extent the economic operation of the process dictates.

The rapidity of the transfer of silver iodide from the colloidal particles through the liquid to the granular mass will be greater in proportion to the disparity in size of the colloidal particles in suspension and the macro-crystalline particles on or in the granules and will therefore be greater in proportion as the colloidal particles are smaller. It is, therefore, important to the successful operation of the process that the depositing operation should take place either before any precipitate forms or while the precipitate is still in colloidal or extremely finely divided condition and before the precipitate has become aggregated into larger masses. For this reason it is desirable as above stated to percolate the liquid through the percolation mass immediately or promptly after the formation of the potential precipitate.

The result of the above described operation is to cause deposition of solid silver iodide in or on the granular mass of the percolation body and an important feature of the invention is that said granular mass is in substantially quiescent condition so that when the silver iodide has been thus deposited it will be in collected condition without necessity of any further filtering, settling or other mechanical separating operations.

The deposition of the desired constituent upon the surface or in the pores of the percolation mass is insured and enforced by making such surface of the same kind of material as the constituent which is to be deposited or at least effectively isomorphic with such material, so that such surface may serve as an inoculating or predisposing agent for the deposition or crystallization of the desired constituent thereon and after inception of such deposition the material already deposited will continue to serve as such an agent.

It will be seen that the above described mode of procedure differs radically from the usual procedure of agglomeration and filtration in that the desired constituent is deposited out of the solution in solid form in or on the collecting body or percolation mass instead of being caught in the interstices of a filtration body. The passages or interstices in the percolation body may therefore be and preferably are much larger than would be the case if the operation were one of filtration. The percolation body therefore does not materially influence or restrain the free flow of liquid therethrough and in particular, it does not materially restrain the free passage of suspended matter which may be present as undesirable impurities and which will not be selectively deposited on the granular mass in the manner above set forth. The linear dimensions of the interstices or passages in the percolation mass easily may be of the order of a hundred to a thousand times those of the interstices in a filter body required to mechanically retain particles as fine as many of those existing in the colloidal suspension formed by merely stirring the precipitating reagent into the body of the solution to be treated according to the present usual procedure even after some hours lapse of time.

Impurities such as colloidal clay or particles of organic matter, or tarry or oily constituents that may occur in the brine being treated will therefore, in general, pass freely through the percolation body without collection and insofar as they may be caught by such body they will not, in general, interfere with the free transference by re-solution and deposition, as above described, of the constituents of the colloidal particles on the surfaces of the percolation body. In this respect the fact that such surface is composed of material which is of the same kind or at least effectively isomorphic with the constituent it is desired to collect and that the brine after passing the mixing nozzle is supersaturated with respect to this material of the percolation body leads to a selective action in collecting such constituent to the exclusion of others which may be present in mere mechanical suspension or true (non-supersaturated) solution.

In some cases I may provide the granules of which the percolation body is composed, with a protecting coating of more or less gelatinous or waterpermeable material, such for example, as agar agar, gelatinous silicic acid, reprecipitated cellulose (hydrocellulose et cetera) through which diffusion may take place with consequent eventual deposition of the desired constituent upon the granules, but which will protect the granules from mechanical disintegration or abrasion.

After the desired constituent, for example, iodine has been collected or deposited as above described, it may be removed in any suitable manner, for example by passing through the pipe connection 12 a suitable reagent such as (a) a gas, or for example, chlorine or hydrogen at elevated temperature whereby the halogen sought will be carried off in gaseous form either free or combined and can be collected and elaborated into marketable products by well known procedures while the heavy metal (for example silver or copper) is left behind in the solid state either as the free element (as for example if hydrogen has been used) or as a compound (as for example if chlorine has been used). (b) A solvent for the heavy metal halide as a whole such as a solution of ammonium hydroxide, sodium thiosulphate or potassium cyanide, which could then be further elaborated by well recognized methods into whatever particular products economic conditions might dictate, the choice of solvent depending largely upon what final products are contemplated and the processes selected to arrive at them. (c) A liquid reagent which will remove the halogen (usually as an alkali halide) and leave the heavy metal behind in solid form either as element or compound. For example in the case of cuprous or mercurous halides, sodium or potassium hydroxides will extract alkali metal halide in solution leaving the corresponding heavy metal oxides (or hydroxides) which may in turn be extracted by use of appropriate acids (as for example nitric for mercurous and hydrochloric for cuprous) and the resulting solutions be used as reagent for removal of halogen from more brine.

In the case of silver the relative solubilities of halides and oxide or hydroxide are less favorable to the technical application of the analogous reactions but if a reducing agent such as formaldehyde is added along with the alkali, the halide of this alkali may be extracted and metallic silver left behind which can later be dissolved out with, for example, nitric acid and thus return the silver in form for use as reagent for separation of more halide from the brine. In place of alkali or alkaline earth hydroxides the corresponding sulphides may be employed to extract the halogens from their combination with the heavy metals as halide of the alkali (or alkaline earth) leaving the solid sulphide of the heavy metal which by treatment with appropriate oxidizing agents as for example nitric acid can be later converted into soluble compounds of the heavy metal, brought into solution and removed.

It will be understood that sufficient of the original heavy metal compound may be retained in the percolation body to serve as a foundation for deposition in further operations of the process, or if desired the mass may be completely stripped of its heavy metal constituent and recoated or reimpregnated with same in any suitable manner.

The above described operation may be applied, for example, to the recovery of bromine in similar manner to the described operation for iodine recovery, silver bromide being used as the collecting body. For the precipitation of iodine or bromine from dilute solutions I may use other precipitating agents, for example, the bromine may be set free by the action of chlorine and then precipitated as analin tribromid, according to the process described in Industrial and Engineering Chemistry vol 21, page 424, May 1929 ("Recovery of Bromine from Sea Water", by Charles A. Stine) the final collection of the compound being, however, effected by deposition on a collecting body, as above set forth, instead of filtration, as described in said article.

The process may also be applied to the recovery of difficultly soluble constituents from dilute solutions generally, for example, for the recovery of gold where the latter has been removed from ores, as chloride, by chlorination, and solution and is in process of being reduced from such solution by reducing agents such, for example, as ferrous sulphate, and is about to precipitate or has commenced to precipitate in colloidal form constituting, in either case, a potential precipitate, as above defined, the collecting body being in that case coated for example with metallic gold.

Instead of adding the precipitating agent to the solution in one operation, it may, in some cases, be desirable as illustrated in the flow sheet, Fig. 2, to introduce the precipitating agent in a plurality of portions in successive stages, producing a succession of potential precipitates, the solution being passed, immediately after each such potential precipitation, into contact with a substantially quiescent collecting body whose surfaces are composed of material effectively isomorphic with the constituent to be collected.

While silver salts are advantageous reagents for the above described operations, it is possible under certain conditions to utilize other reagents, for example, cuprous or mercurous salts. In such cases the apparatus shown in Fig. 3 may be used in performing the collecting operation required for separation of the bromine and/or iodine from the brine, said figure showing a unit of said apparatus. This unit comprises a tank or vessel 15 within which is mounted a percolation mass or body 16 which may consist, for example, of granular carbon impregnated or coated with a suitable substance such as cuprous or mercurous bromide or iodide. Said tank is provided with an inlet 17 for brine, and an overflow outlet 18, the arrangement being preferably such that the brine is introduced below the percolation body 16 and flows upwardly through said body.

The electrical circuit means for applying potential difference as above described, may comprise an electromotive source 22 connected through connection 23, including an ammeter 24 and regulable resistance 25, to the electrode 21 aforesaid, the negative terminal of said source being connected by wire 26 to the percolation body 16, which contains sufficient carbon to render it metallically conducting. For proper determination of the potential difference applied in this manner, any suitable single potential measuring means may be used, for example, a standard half cell 28 (see Lewis, "A System of Physical Chemistry", London 1916, page 203), presenting a constant potential difference may communicate at one side through an electrolytic connection 30 with the liquid in tank 15, and at the other side through wire 31 and potentiometer or voltmeter 32 with the wire 36 connected to the negative side of electromotive source 22, and to the body 16. The potential difference applied between electrodes 16 and 21 is maintained at the required value, according to the indications of potentiometer or voltmeter 32 by adjusting resistance 25 and/or electromotive force of source 26.

The ammeter 24 indicates the current necessary to effect reduction of any of the metallic ions in the higher states of oxidation or other oxidizing agents, reaching the percolation electrode, see (Zeitschrift für Physikalische Chemie, Leipzig 1903—vol. 42, p. 385).

In case a compound of metal of variable valency is used as the reagent, it is desirable to provide means for holding such compound at the desired valence, which in the cases here cited is the lower valence. For this purpose an electrode 21 of non-attackable material, such as carbon, may be mounted within the fluid above the percolation body 16 and a circuit may be established including said electrode and the carbon of said percolation body serving as the other electrode and also including a source of electro-motive force, so as to maintain a potential difference between the liquid being treated and the carbon of the percolation body (serving in the present illustration as negative electrode) of such magnitude as to counteract any oxidizing actions of the air or other dissolved or entrained oxidizing agent in the liquid which is being treated and which oxidizing agent would otherwise partly convert the $Hg^+$ or $Cu^+$ compounds in the percolation body or in the solution to $Hg^{++}$ or $Cu^{++}$ compounds and thus result in production of compounds of such high solubility as to cause undue removal of same from the percolation body by solution in the liquid. The electromotive force so applied, however, must not be so large as to reduce the compounds in the percolation mass to metal.

In the operation of my process, using the apparatus shown in Fig. 3, for the recovery for example of iodine from a brine or solution, such brine or solution after treatment with a precipitating reagent forming a potential precipitate of mercurous or cuprous iodide as above described, is passed immediately and preferably upwardly through the percolation mass which may consist of granular carbon coated or impregnated, for example, with mercurous or cuprous iodide, as the case may be, or a substance isomorphic therewith, with the result that the mercurous or cuprous iodide in condition of potential precipitation in the liquid is deposited on the granules of said body in collected and macro-crystalline condition. During this operation sufficient hydrogen ion concentration should be maintained in the solution being treated to enforce deposition of the mercurous or cuprous iodide and protect this from conversion to basic salt or oxide. For this purpose either acid or alkali as required may be supplied to the solution through a pipe 34 leading from an acid supply means 35 or through a pipe 40 leading from an alkali supply means 41. When sufficient mercurous or cuprous iodide has been accumulated on the granules of the body 16 the said body may be washed by means of water supplied from supply means 38 through a pipe 37 and the deposited mercurous or cuprous iodide may then be removed and recovered in any suitable manner, for example, in the manner above described in connection with the apparatus shown in Fig. 1. Valves 36, 39, and 42, may be provided for regulating the supply of acid, alkali or water through the respective pipes aforesaid.

In dealing with extreme cases of dilution of the halide sought in brines such for example, as iodine in sea water itself where it has been reported to be less than one part per ten million, we are rapidly approaching the limits of solubility of silver iodide in pure water itself and may actually have exceeded its solubility in the pure state in the brine. However, even when this is the case it may still deposit out to some extent in solid solution in compounds crystallizing isomorphically with it. Thus for example, in a brine containing easily precipitable amounts of bromides or chlorides but a concentration of iodides below that corresponding to saturation of even the macrocrystalline pure iodide of the heavy metal selected as precipitating reagent (for example Ag), iodine may still be removed from the solution by adding sufficient reagent (E. g. $AgNO_3$) to cause precipitation of AgBr and/or AgCl, the AgI being carried out by these in solid solution and the degree of removal of I from the brine depending, among other things, on the amount of excess of these other halides precipitated therewith.

In cases of brines so highly diluted in the desired constituent the steps for recovery of the silver in the final discharge solution from the iodine collecting units becomes of greatly enhanced importance and the cost of this may even become the economically limiting factor.

The present process may also be advantageously applied in the recovery of radium from its ores especially in the stage where this element is ordinarily removed from highly dilute solution by precipitation in solid solution with barium sulphate.

I claim:

1. The process of removing a substance from dilute solutions thereof which consists in mixing with the solution a precipitating agent capable of precipitating said substance from the solution and thereafter bringing the solution containing potential precipitate in contact with a quiescent collecting body of large effective surface of such composition and in sufficiently massive condition to cause deposition of said substance on or in said body from the potential precipitate.

2. A process as set forth in claim 1, in which the surfaces of said collecting body are formed of a substance which is effectively isomorphic with the substance to be collected.

3. A process as set forth in claim 1, in which the surface of said collecting body is of the same kind as the substance to be collected.

4. The method of separating colloidal and/or potential precipitate from a solution which consists in percolating said solution through a percolation mass of quiescent granular material, whose granular parts are of sufficiently greater size than the colloidal particles of the precipitate to effect deposition of the constituent of said precipitate from the residual content thereof in the solution into said granular parts with eventual re-solution of the colloidal precipitate in the solution followed by deposition of the part so redissolved on said granular parts.

5. The process of recovering a constituent of a solution which consists in mixing with the solution a precipitating agent so as to supersaturate or temporarily precipitate said constituent in finely divided form and promptly bringing the solution containing the finely divided precipitate, if any, and residual dissolved constituent in contact with a granular collecting body whose pore surfaces are effectively isomorphic with said constituent, so as to cause eventual permanent deposition of the said constituent on the said body, in macro-crystalline or aggregated form.

6. The process of removing iodine or bromine from dilute brines in which it exists as iodide or bromide ions, which consists in adding to said brines ions of an element or radical capable of forming an insoluble iodide or bromide with said iodide or bromide ions, and then passing the mixture promptly through a percolation mass with pore surfaces comprising a substance of the same composition as the solid halide sought of so open a structure as not to materially influence the free flow of the liquid.

7. The process of removing iodine or bromine from brines in which it exists as iodide or bromide ions which consists in adding to said brines ions of an element or radical capable of forming an insoluble iodide or bromide with said iodide or bromide ions, and then passing the mixture promptly through a percolation mass with pore surfaces comprising a substance of the same composition as the solid halide sought of so open a structure as not to catch or remove the colloidal or finely suspended matter contained therein.

8. The process of removing iodine or bromine from brines in which it exists as iodide or bromide ions which consists in adding to said brines ions of an element or radical capable of forming an insoluble iodide or bromide with said iodide or bromide ions, and then passing the mixture promptly through a percolation mass of so open a structure as not to permanently catch or mechanically filter out the colloidal or finely divided suspended matter but which percolation mass has been adapted to collect said desired insoluble iodide or bromide by having its internal surfaces and/or pores of its granules coated or impregnated with the aforesaid insoluble iodide or bromide in a macro-crystalline or macro-aggregated form.

9. The process of removing a constituent from a dilute solution which consists in mixing with the solution a reagent capable of precipitating said constituent from the solution, said reagent being added to the solution in a plurality of successively added portions, so as to produce a succession of potential precipitates therein, and passing the solution promptly after each such addition, in contact with a quiescent granular collecting body whose pore surfaces consist of material effectively isomorphic with the said constituent, said body being in sufficiently massive condition to cause deposition of said constituent on said body from said potential precipitate.

FREDERICK G. COTTRELL.